(12) United States Patent
Kabasawa

(10) Patent No.: US 6,356,415 B1
(45) Date of Patent: Mar. 12, 2002

(54) DISK DRIVE HEAD CARRIAGE LOCK HAVING SOLENOID WITHIN FRAME OF LOCK MEMBER

(75) Inventor: Hidetoshi Kabasawa, Saitama-Ken (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/428,764

(22) Filed: Oct. 28, 1999

(30) Foreign Application Priority Data

Oct. 29, 1998 (JP) .......................................... 10-309101
Oct. 29, 1998 (JP) .......................................... 10-309102

(51) Int. Cl.[7] ................................................. G11B 5/54
(52) U.S. Cl. ................................. 360/256.3; 360/266.5
(58) Field of Search ........................... 360/99.02, 99.06, 360/256, 256.3, 266.5; 369/244

(56) References Cited

U.S. PATENT DOCUMENTS

| | | | | |
|---|---|---|---|---|
| 5,231,615 A | * | 7/1993 | Endoh .......................... | 369/32 |
| 5,444,690 A | * | 8/1995 | Childers, III et al. ........ | 369/263 |
| 5,650,891 A | * | 7/1997 | Thayne et al. ............ | 360/99.08 |
| 6,144,526 A | * | 11/2000 | Ginosar et al. ............. | 360/133 |
| 6,219,204 B1 | * | 4/2001 | Kabasawa ................ | 360/266.6 |
| 6,252,747 B1 | * | 6/2001 | Kabasawa ................ | 360/266.5 |

FOREIGN PATENT DOCUMENTS

JP          6-5024          1/1994

* cited by examiner

*Primary Examiner*—Jefferson Evans
(74) *Attorney, Agent, or Firm*—Anderson Kill & Olick; Eugene Lieberstein; Michael Meller

(57) ABSTRACT

A head carriage lock mechanism for a magnetic disk drive has a lock member, a lifter, a link member and a solenoid. The lock member is shaped in the form of a quadrilateral frame, with arms extending perpendicularly from a front panel and a rear panel so as to connect the two panels. The right arm of the lock member, which approaches the head carriage, has a rack that engages an engaging portion of the head carriage so as to lock the head carriage in place so as to prevent damage to the head carriage during transport. The solenoid that drives the lock mechanism is positioned inside the space enclosed by the frame of the lock member, making more efficient use of the space inside the disk drive and making it possible to make the disk drive more compact.

7 Claims, 14 Drawing Sheets

DISK DRIVE HEAD CARRIAGE LOCK HAVING SOLENOID WITHIN FRAME OF LOCK MEMBER

BACKGROUND OF THE INVENTION

1. Field of the Invention

The present invention relates generally to a disk drive, and more particularly, to a disk drive adapted so that a head supported by a head carriage moves in a radial direction of a disk-type recording medium and reads and writes information when the disk is inserted in the disk drive.

2. Description of the Related Art

On electronic equipment, for example personal computers and word processors, a disk drive is provided as a means of recording information. In the case of a magnetic disk drive, when a disk cartridge which is the recording medium is loaded into the disk drive, a magnetic disk contained in the disk cartridge is rotated and at the same time the magnetic head slides across the magnetic disk, reading and writing information.

The magnetic disk drive as described above is provided with a recording medium loading device consisting of a disk holder into which the disk cartridge is inserted and a slider that slides from a cartridge insert/eject position to a cartridge load position when the disk cartridge is inserted. The recording medium loading device moves the disk holder from a recording medium unload position to a recording medium load position in tandem with the sliding of the slider.

Generally, in the conventional disk drive, pressing an eject button provided on a front edge of the slider moves the disk holder from the recording medium load position to the recording medium unload position, ejecting the disk cartridge.

The slider is urged in one direction by a coil spring or the like, so that when a disk cartridge is inserted a latch lever is pressed against an edge portion of the disk cartridge and rotates while at the same time a locking of the slider by the latch lever is released. As a result, the slider slides in the direction in which it is urged by the coil spring, moving the disk holder to the recording medium load position. At this time the disk holder drops from the recording medium unload position to the recording medium load position, chucking the disk inside the disk cartridge onto the turntable.

However, in an effort to increase the density of recording capacity by increasing the speed of rotation of the disk, the capacity of the magnetic disk itself has been greatly increased. The air currents generated by the high rotational speed of such so-called high-density disks exert a force upon the magnetic head, so with high-density magnetic disk drives the magnetic head actually floats slightly above the surface of the magnetic disk so as to avoid scratching the surface of the magnetic disk while reading information from and writing information to the magnetic disk.

Additionally, the use of a voice coil motor for the high-density magnetic disk drive in place of the lead screw used conventionally as means for driving the head carriage that supports the magnetic head has been studied. High-density magnetic disks require precise positioning of the magnetic head in order to function properly, and the advantage of using a voice coil motor to drive the head carriage that supports the magnetic head is that the voice coil motor can position the head carriage more precisely than the conventional lead screw can do.

However, since the voice coil motor drives the coil without actually contacting the coil, when no magnetic disk is loaded the head carriage can be moved by external shocks and vibrations such as those that typically occur during shipping and handling. If the head carriage moves it may hit the yoke and be damaged thereby. As a result, there is a need to lock the head carriage in place so that the head carriage does not move, in order to prevent the head carriage from being damaged during transit.

A lock member for locking the head carriage in place as described above, in which a solenoid is used to drive the lock member, is known. However, in that case the solenoid is placed in the vicinity of the lock mechanism and together the lock mechanism and the solenoid take up additional space, which hinders the desirable process of making the entire disk drive more compact.

Moreover, it is sometimes the case that a mechanism for holding the lock member for locking the head carriage in a lock position as described above is provided as a separate mechanism. However, doing so complicates the timing of the disk cartridge loading operation with respect to the head carriage locking operation. Specifically, if this timing is off, then the head carriage may remain unlocked even though a disk cartridge is not loaded, or conversely, the head carriage may be locked even though a disk cartridge is loaded. Neither of these two states is desirable.

SUMMARY OF THE INVENTION

Accordingly, it is an object of the present invention to provide an improved and useful disk drive in which the above-mentioned disadvantages are eliminated.

Another and more specific object of the present invention is to provide a disk drive in which the space required for mounting the lock member for locking the head carriage and the solenoid for driving the lock member is reduced.

The above-described objects of the present invention are achieved by a disk drive comprising:

a head for reading information from and writing information to a disk-like recording medium;

a head carriage supporting the head and moving in a direction of a radius of the disk-like recording medium;

a lock member locking the head carriage in place whenever the disk-like recording medium is not loaded in the disk drive;

and a solenoid for driving the lock member, the lock member comprising:

an arm part disposed so as to be aligned in a direction of movement of the head carriage, an engaging part that engages the head carriage and locks the head carriage in place being formed on the arm part; and a pair of supporting parts extending from near both ends of the arm part and supporting the engaging part, the solenoid disposed so as to be contained within a space bounded by the lock member arm part and pair of supporting parts.

According to the invention described above, the solenoid is positioned within the arms and supports of the lock member, thus using less space than if the solenoid and lock member were positioned at a distance from each other. As a result, the disk drive can be made more compact.

Additionally, the above-described objects of the present invention are also achieved by the disk drive as described above, wherein a rotational center of the lock member and a shaft driven by the solenoid are coaxially disposed.

According to the invention described above, the space required to accommodate the lock member and the solenoid can be further reduced.

Additionally, the above-described objects of the present invention are also achieved by the disk drive as described above, wherein the lock member comprises a quadrilateral frame comprising a pair of arm parts and a pair of supporting parts disposed at right angles to and connected with both ends of the pair of arm parts.

According to the invention described above, the solenoid can be positioned inside the space enclosed by the lock member, making more efficient use of the space inside the disk drive and making it possible to make the disk drive more compact.

Additionally, the above-described objects of the present invention are also achieved by the disk drive as described above, wherein the solenoid drives a lifter that contacts a head arm of the head carriage so as to bring the head close to the disk-like recording medium at the same time as the solenoid unlocks the head carriage from the lock member.

According to the invention described above, information can be read from and written to the disk-like recording medium.

Additionally, the above-described objects of the present invention are also achieved by a disk drive, comprising:
 a recording medium transport mechanism for transporting a disk-like recording medium to a predetermined load position;
 a head for reading information from and writing information to a disk-like recording medium;
 a head carriage supporting the head and moving in a direction of a radius of the disk-like recording medium; and
 a lock member locking the head carriage in place whenever the disk-like recording medium is not loaded in the disk drive,
 a holding part holding the lock member in a lock position whenever the head is in an unloaded state being provided on the recording medium transport mechanism.

According to the invention described above, the lock member can both unlock the head carriage when the disk-like recording medium is transported and loaded by the recording medium transport mechanism as well as lock the head carriage securely in place when the disk-like recording medium is elected so that the head carriage cannot move.

Additionally, the above-described objects of the present invention are also achieved by the disk drive as described above, wherein the holding part is provided on a slider that slides in response to an insertion of a disk-like recording medium.

According to the invention described above, the holding part separates from the lock member as the disk-like recording medium is inserted into the disk drive, thereby causing the lock member to unlock the head carriage.

Additionally, the above-described objects of the present invention are also achieved by the disk drive as described above, wherein the lock member is disposed between the holding part formed on the slider and the head carriage.

According to the invention described above, the space required to accommodate the lock member can be reduced and at the same time the movement of the slider as the disk-like recording medium is inserted into the disk drive causes the lock member to unlock the head carriage.

Other objects, features and advantages of the present invention will become more apparent from the following detailed description when read in conjunction with the accompanying drawings.

DESCRIPTION OF THE PREFERRED EMBODIMENTS

A detailed description will now be given of an embodiment of a disk drive according to the present invention, with reference to the accompanying drawings.

Figure 1:
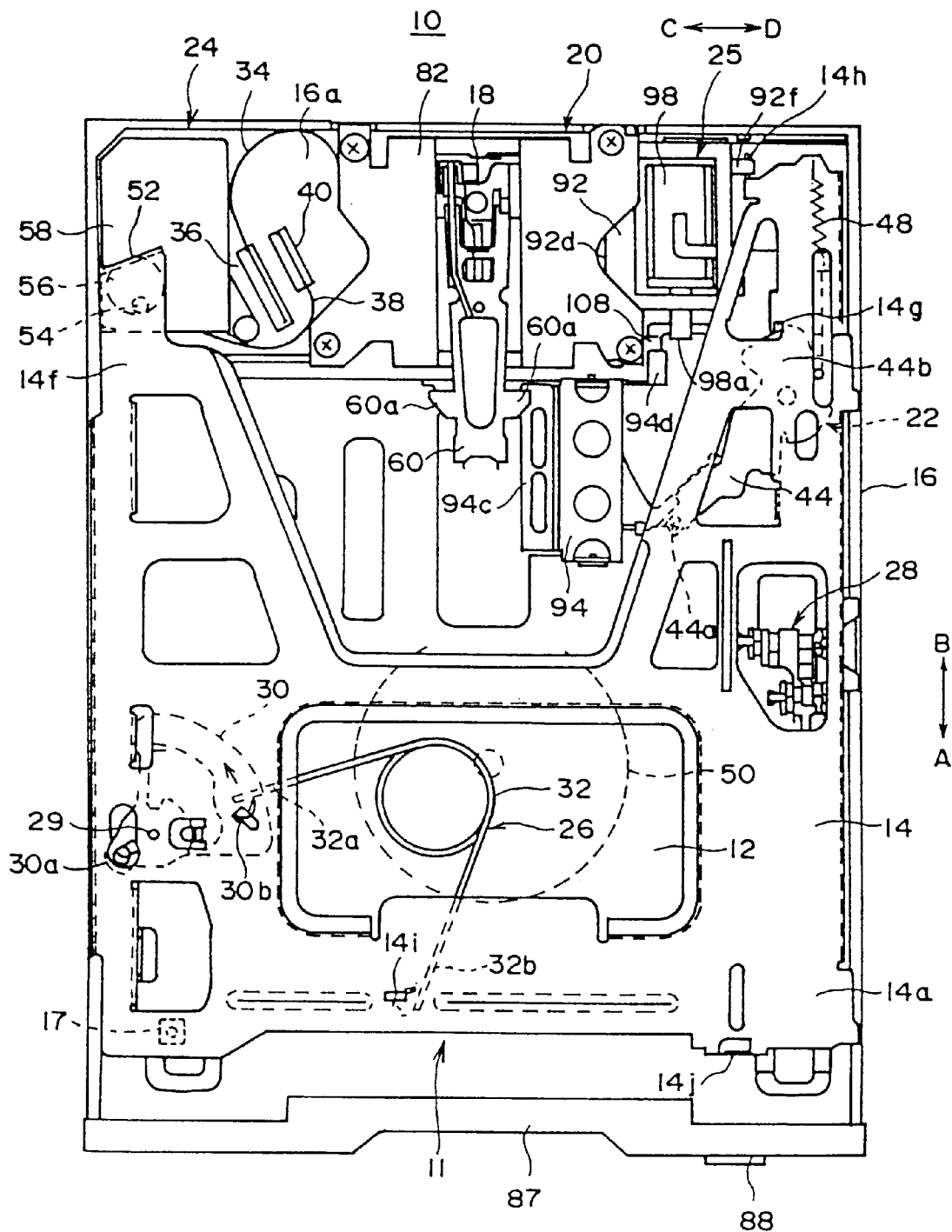
FIG. 1 is a plan view of an embodiment of a disk drive according to the present invention, in a state prior to the loading of a disk cartridge.
Figure 2:
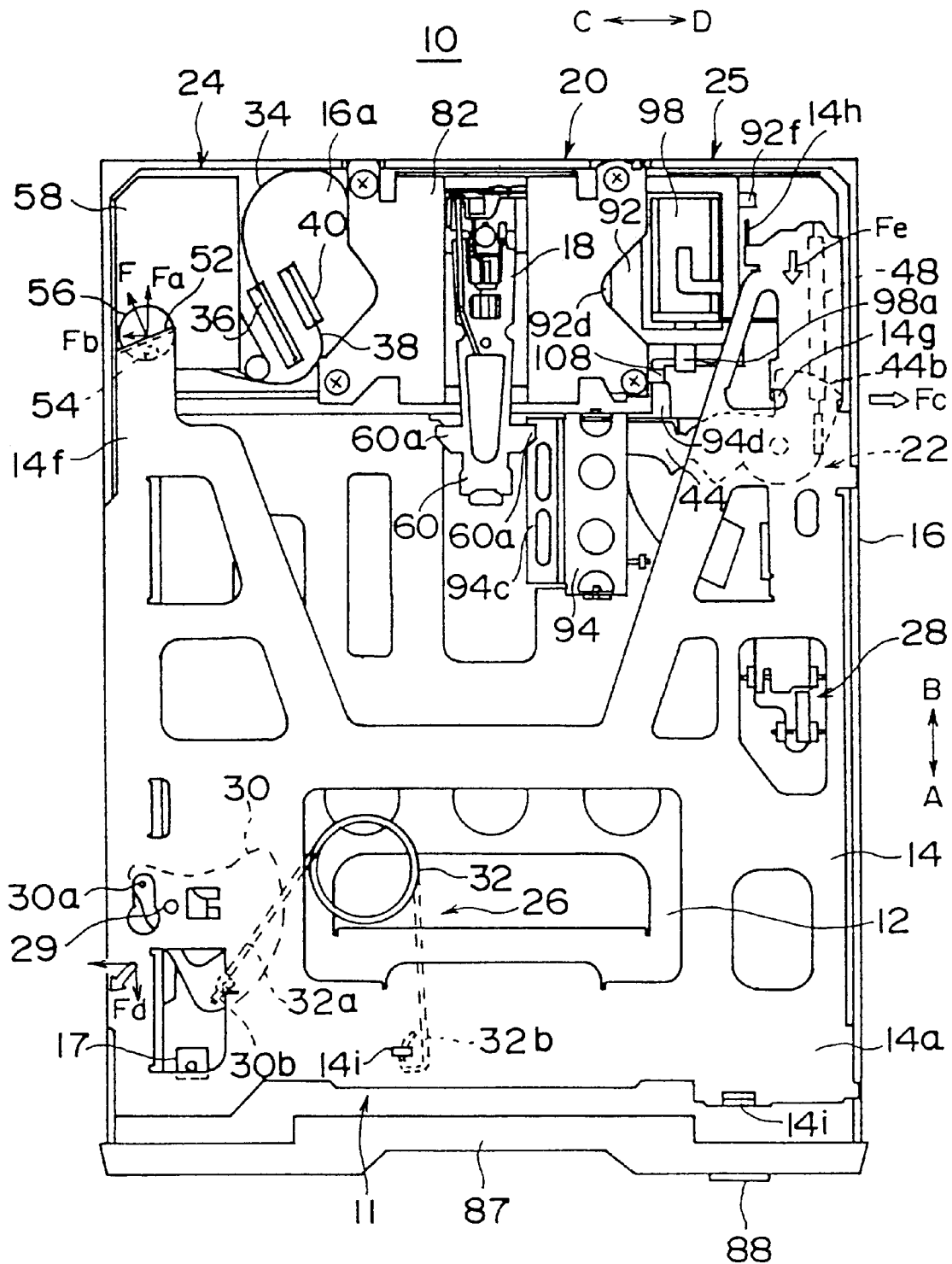
FIG. 2 is a plan view of the disk drive shown in FIG. 1, in a state in which the disk cartridge is loaded.

FIG. 1 is a plan view of an embodiment of a disk drive according to the present invention, in a state prior to the loading of a disk cartridge. FIG. 2 is a plan view of the disk drive shown in FIG. 1, in a state in which the disk cartridge is loaded.

As shown in FIGS. 1 and 2, the magnetic disk drive 10 contains a recording medium loading device 11 which is constructed so that a disk holder 12, into which a disk cartridge not shown in the diagrams is inserted, and a slider 14, which slides in a direction indicated by the arrows A and B as shown in the diagrams and which raises and lowers the disk holder 12, are mounted on top of a frame 16. The slider 14 is disposed so as to slide freely on top of the frame 16, so that when a disk cartridge is inserted into the disk holder 12 the slider 14 slides in the direction of arrow A and lowers the holder 12 from a recording medium unload position to a recording medium load position.

A turntable 50 driven by a disk rotation motor and a head carriage 18 are disposed so as to protrude above a flat panel 16a of the frame 16 from below the frame 16. Further, a disk loading switch 17 comprising a microchip for detecting the loading of a disk cartridge inserted into the disk holder 12 is mounted on a front left side of the flat panel 16a of the frame 16. The disk loading switch 17 is positioned below the disk holder 12, so it is shown by dotted lines in FIGS. 1 and 2.

Additionally, a head carriage drive unit 20 for driving the head carriage 18, a latch mechanism 22 for engaging the slider 14, an auto-eject mechanism 24 for driving the slider 14 in the direction of arrow B in order to eject a disk cartridge inside the disk holder 12, and a head carriage lock mechanism 25 for locking the head carriage 18 in place when reading or writing information by using a magnetic head is not being performed so that the head carriage cannot move, are mounted on the flat panel 16a of the frame 16. Further, a circuit board not shown in the diagram and having a control circuit is mounted on a lower surface of the frame 16.

As described above, in the present embodiment the head carriage lock mechanism 25 is provided on a right side of the head carriage 18 and the auto-eject mechanism 24 is provided on a left side of the head carriage 18.

Additionally, a damper mechanism 26 for cushioning the sliding-action of the slider 14 and a mechanism 28 for preventing improper insertion of the disk cartridge in the event that the wrong end of the disk cartridge is being inserted into the disk holder 12 are provided on a lower surface of the slider 14. As with the conventional damper mechanism, the damper mechanism 26 comprises a damper plate 30, one end 30a of which engages the frame 16 and in that state is rotatable supported by a pivot 29 of the slider 40 which is represented in FIG. 1 by a dashed line, and a damper spring 32 that rotatable urges another end of the damper plate 30. One end 32a of the damper spring 32 is engaged by an engaging part 30b of the damper plate 30 and another end 32b is engaged by an engaging part 14i of the slider 14.

When the slider 14 is closer to a final position in the direction of arrow B than to a final position in the direction of arrow A, a force of the damper spring 32 of the damper mechanism 26 urges the slider further in the direction of arrow B. Conversely, when the slider 14 is closer to a final position in the direction of arrow A than to a final position in the direction of arrow B, a force of the damper spring 32 of the damper mechanism 26 urges the slider further in the direction of arrow A.

In other words, when the slider 14 moves from a final position in direction B toward a final position in direction A, the damper mechanism 26 urges the slider 14 in direction B during the first half of the displacement of the slider, that is, in a direction opposite to the direction in which the slider 14 is moving, and urges the slider 14 in direction A during the second half of the displacement, that is, in a direction identical to the direction in which the slider 14 is travelling. Doing so decreases the speed of movement of the slider 14 during the first part of its displacement and increases the speed of movement of the slider 14 during the last part of its displacement. By controlling the speed of movement of the slider 14 as described, the disk holder 12 can be securely positioned in the disk drive 10.

When a disk cartridge is inserted, the slider 14, which is engaged by the latch mechanism 22 for engaging the slider 14, slides in the direction of arrow A and moves the disk holder 12 from a recording medium unload position to a recording medium load position. The latch mechanism 22 comprises a latch lever 44 for engaging the slider 14 and a coil spring 48 for urging the latch lever 44 in a counter-clockwise direction.

One end of the coil spring 48 is engaged by the latch lever 44 and another end is engaged by the slider 14. At the same time as the coil spring 48 urges the latch lever 44 in the counter-clockwise direction the coil spring 48 also urges the slider 14 in the direction of arrow A. By using the same spring to urge both the latch lever 44 and the slider 14, the number of parts in the disk drive can be reduced.

As with the conventional latch lever, the latch lever 44 has a first engaging part 44a for engaging a shutter of the disk cartridge and a second engaging part engaged by a projection 14g of the slider 14.

When a disk cartridge is inserted into the disk holder 12 with the disk drive in the state shown in FIG. 1, the latch lever 44 rotates in a clockwise direction and the engaging part 44a opens the disk cartridge shutter as shown in FIG. 2. Then, the projection 14g on the slider 14 releases the engagement of the slider 14 with the engaging part 44b once the insertion of the disk cartridge into the disk holder 12 has been completed.

As described above, the force of the coil spring 48 engaged by a right edge portion of the slider 14 slides the slider 14 in the direction A and lowers the disk holder 12 into a recording medium load position. The magnetic disk of the disk cartridge inserted into the disk holder 12 is then loaded to a recording medium load position and rotatably clamped by the turntable 50.

Additionally, a hold/drive part 14h is provided on a front edge of the right edge portion of the slider 14. As will be explained later, this hold/drive part 14h holds a lock member 92 in a lock position locking the head carriage 18 in place when a disk cartridge is not loaded. Thus the lock member 92 can be held in a lock position in conjunction with the operation of the slider 14, so the head carriage 18 can be locked securely in place whenever a disk cartridge is not loaded.

Additionally, when an eject signal is input by pressing an eject button 88 in a state in which the disk cartridge is loaded as shown in FIG. 2, as described above the auto-eject mechanism 24 slides the slider 14 in direction B and simultaneously raises the disk holder 12 to the recording medium unload position and releases the latch lever 44 as shown in FIG. 1 when the reading of information from or the writing of information to the magnetic disk is completed.

As described above, the latch lever 44 is rotated in the counter-clockwise direction by the force of the spring coil 48, ejecting the disk cartridge inside the disk holder 12 in direction A.

As a result, even if the eject button 88 is pressed while information is being read from or written to the magnetic head, the auto-eject mechanism 24 prevents the ejection of the disk cartridge until such reading and writing of information is completed.

Figures 3A, 3B:
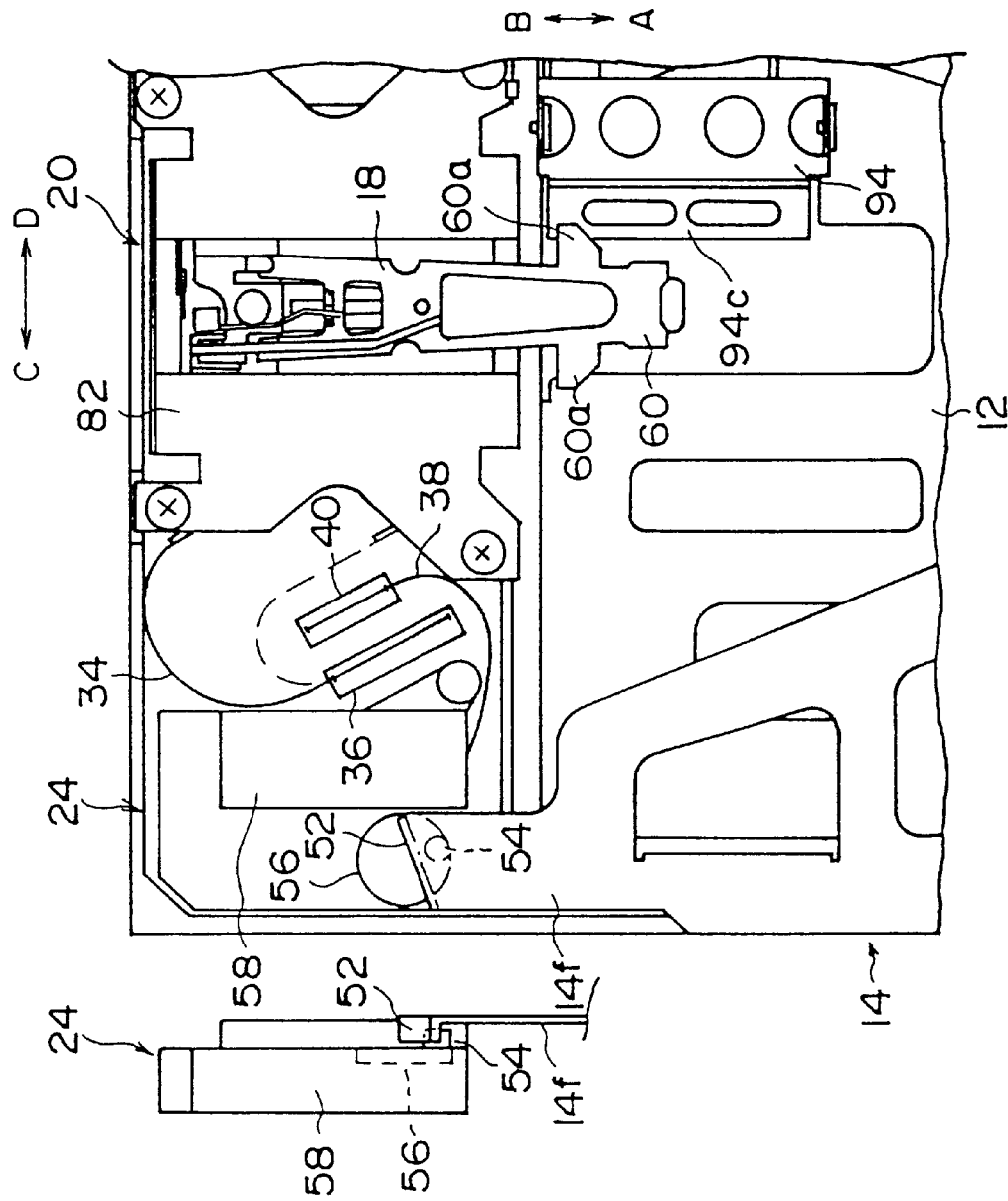
FIGS. 3A and 3B are expanded plan and side views, respectively, of an auto-eject mechanism.

FIGS. 3A and 3B are expanded plan and side views, respectively, of the auto-eject mechanism of the present embodiment.

As shown in FIGS. 3A and 3B, the auto-eject mechanism comprises a projection 52 formed on a left edge portion 14f of the slider 14, a rotating body 56 having an off-center pin 54 that contacts and drives the projection 52, and an eject motor 58 for rotating the rotating body 56.

The projection 52 extends diagonally with respect to the direction of insertion and ejection of the disk cartridge, that is, the A-B direction, and a direction C-D perpendicular to direction A-B. As a result, as will be explained later a force Fa in direction B and a force Fb in direction C are exerted on the projection 52 of the slider 14 when the rotation of the rotating body 56 presses the off-center pin 54 against the projection 52.

As a result, a force attempting to rotate the slider 14 in a counter-clockwise direction can be exerted on the slider 14, thus canceling out a force attempting to rotate the slider 14 in the clockwise direction created by the effects of a force Fd of the damper spring 32 of the damper mechanism 26 and a force Fe of the coil spring 48 urging the slider 14 in direction A.

As a result, the pressing of the slider 14 against a side wall of the frame 16 can be prevented and resistance reduced. Accordingly, the slider 14 can slide smoothly in the direction of ejection, that is, direction B.

Additionally, between the head carriage 18 and auto-eject mechanism 24 are mounted a head carriage connector 36 to which is connected a flexible wire board 34 extending from the head carriage 18 and an auto-eject connector 40 to which is connected a flexible wiring board 38 extending from the auto-eject mechanism 24.

The pair of connectors 36 and 40 are disposed so as to extend in a direction diagonal to the direction of movement of the head carriage 18 and disposed so as to be parallel to each other. The head carriage flexible wiring board 34 is bent into substantially a U-shaped curve and connected to the head carriage connector 36 at a rear side of the head carriage connector 36. The auto-eject flexible wiring board 38 is bent into substantially a U-shaped curve and connected to the auto-eject connector 40 at a front side of the auto-eject connector 40.

As described above, the connectors 36 and 40 are diagonally positioned and so the flexible wiring boards 34 and 38 are bent into substantially U-shaped positions so as to make maximum efficient use of the space in front of and behind the connectors 36 and 40.

Figure 4:
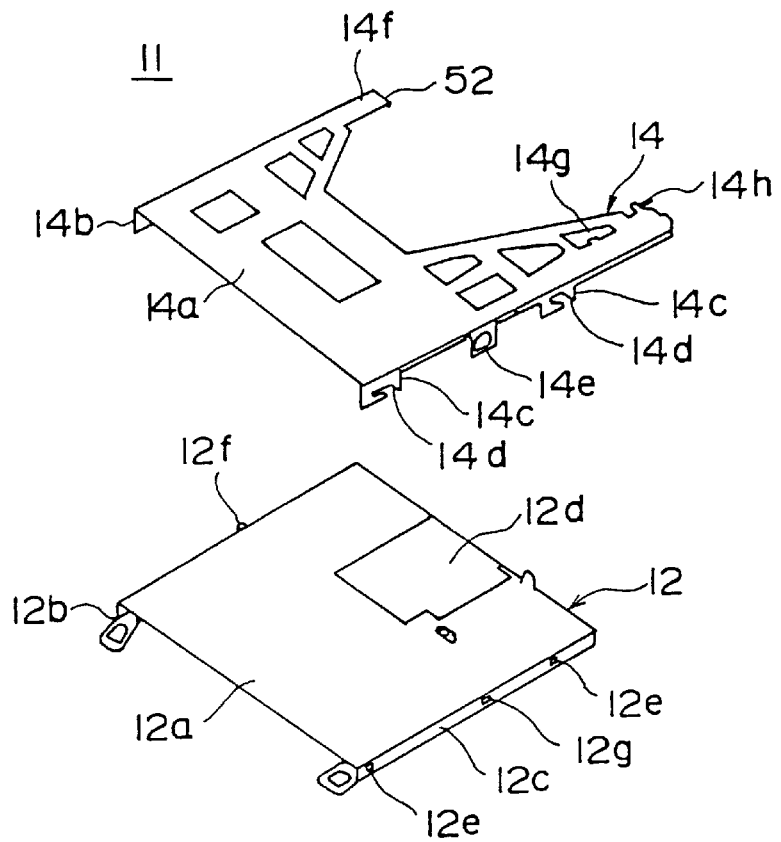
FIG. 4 is an exploded perspective view of a schematic structure of a recording medium loading device.
Figure 4:
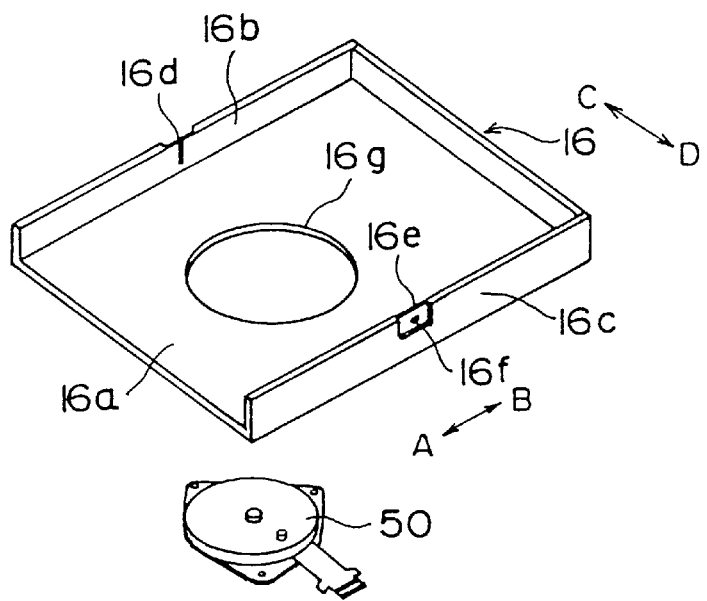

FIG. 4 is an exploded perspective view of a schematic structure of a recording medium loading device As shown in FIG. 4, the disk holder 12 comprises a cover panel 12a and cartridge guides 12b and 12c extending from both sides of the cover panel 12a and bent so as to enclose a disk cartridge. Accordingly, the space enclosed by the cover panel 12a and the cartridge guides 12b and 12c is the space into which the disk cartridge is inserted.

Further, a pair of engaging pins 12e that engage the slider 14 are provided at both sides of the disk holder 12, with guides 12f and 12g projecting from a center of each of both sides of the disk holder 12. The guides 12f and 12g engage guide grooves 16b and 16c provided on each of both side walls of the frame 16 so as to guide the ascent of the disk holder 12.

As will be explained later, at the same time that it ascends the disk holder 12 contacts a projection 60a of a head arm 60 and swings so as to lower the head arm 60 in stages.

As noted previously, the slider 14 is mounted so as to be slidably movable across the top of the disk holder 12, and comprises a substantially J-shaped flat panel 14a, side surfaces 14b and 14c bent downward from each of both sides of the flat panel 14a, slanted grooves 14d formed on each of both side surfaces 14b and 14c which engage the engaging pins 12e of the disk holder 12, and engaging holes 14e that engage projections 16f projecting from the center of each of both side surfaces of the frame 16.

Additionally, a mounting hole 16g for mounting the turntable 50 is provided in a center of the flat panel 16a frame 16.

Figure 5:
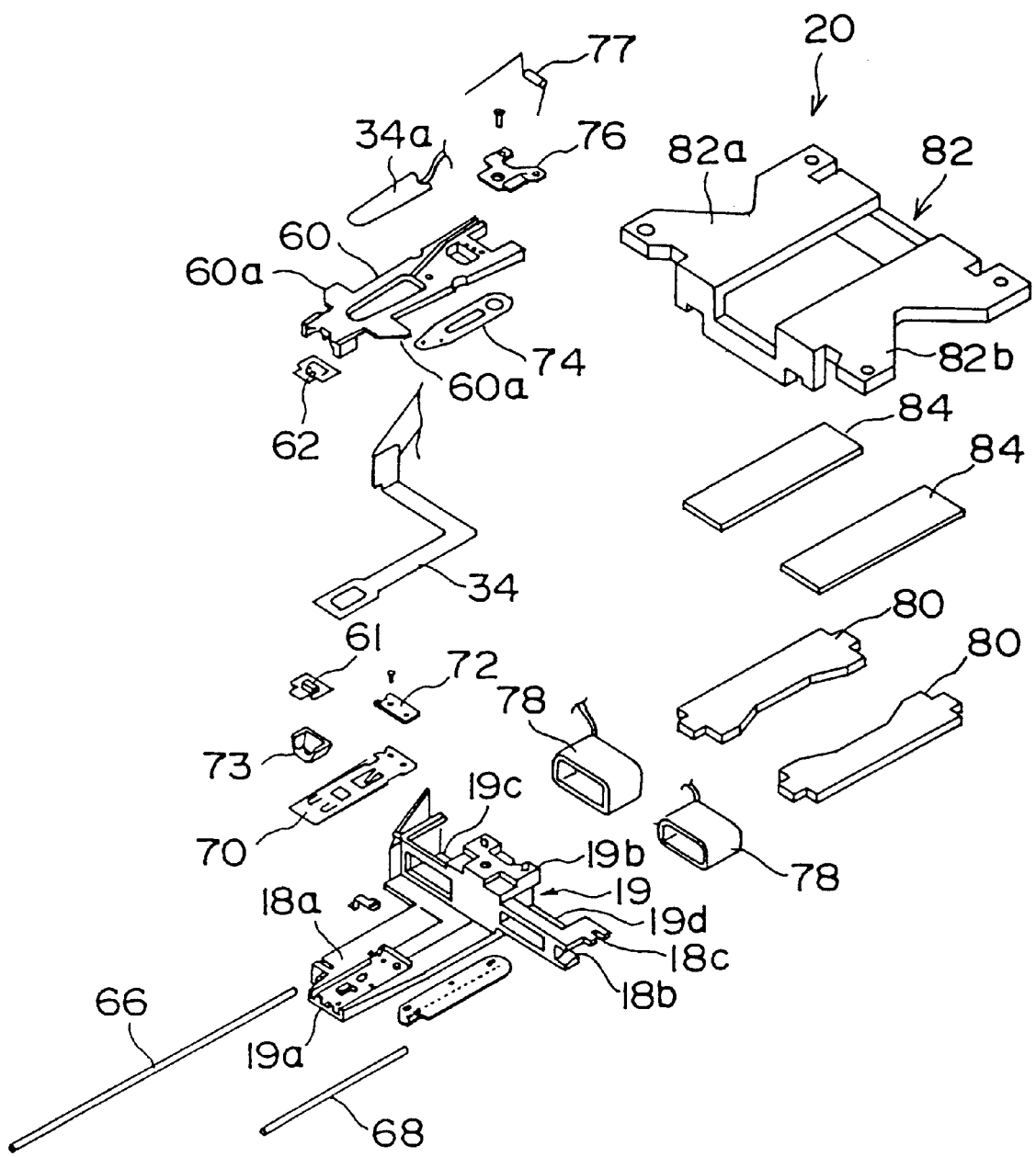
FIG. 5 is an exploded perspective view of a schematic structure of a head carriage mechanism.

FIG. 5 is an exploded perspective view of a schematic structure of a head carriage mechanism.

As shown in FIG. 5, the head carriage 18 has a carriage body 19 that supports a lower magnetic head 61 on an upper-surface of a tip of the carriage body 19 and a head arm 60 that supports an upper magnetic head 62 on a lower surface of a tip of the head arm 60.

Additionally, the head carriage 18 is mounted so as to be movable and guided by guide shafts 66 and 68 extending in a front-and-rear direction, that is, direction A-B. Bearing portions 18a and 18b are provided on each of a left side surface and a right side surface of the head carriage 18, respectively, the bearing portions 18a and 18b engaging the guide shafts 66, 68 so that the head carriage 18 is slidably movable along the guide shafts 66, 68.

It should be noted that bearing portion 18a, which comprises a circular aperture through which the main guide shaft 66 passes, is the main bearing that restricts both lateral displacement of the head carriage 18 as well as the height of the head carriage 18. By contrast, bearing portion 18b is essentially shaped in the form of an inverted C, and determines neither the movement nor the lateral displacement of the head carriage 18. Rather, the bearing portion 18b only restricts the height of the head carriage 18.

The head carriage 18 is driven by a voice coil motor 64 of a carriage displacement mechanism to be described later, in such a way as to be guided by guide shafts 66 and 68 and displaced in direction A-B. In so doing, the magnetic heads 61 and 62 that are supported by the head carriage 18 are slid to a desired track on a magnetic disk not shown in the diagram but contained in the disk cartridge, to magnetically record and reproduce.

The carriage body 19 has an arm portion 19a that extends from the carriage body 19 in the A-B direction. A lower suspension 70, which comprises a leaf spring, is fixedly mounted on an upper surface of the arm portion 19a by a first mounting plate 72. The lower magnetic head 61 is mounted on the lower suspension 70 by means of a lower block 73. Additionally, a flexible substrate wiring board 34 is soldered to the lower magnetic head 61.

The head arm 60 is fixedly mounted to a base 19b of the carriage body 19 by a leaf spring 74, a tip of the leaf spring 74 being fixedly mounted on the base 19b by a second mounting plate 76. As a result, the head arm 60 is swingingly supported in a vertical direction by the leaf spring 74 while at the same time being swingingly urged in a downward direction by a torsion spring 77. Additionally, a flexible wiring board 34a is soldered to the upper magnetic head 62 mounted at the tip of the head arm 60. It should be noted that the flexible wiring board 34a is connected to the flexible wiring board 34 at a rear edge of the carriage body 19.

Additionally, the base 19b of the carriage body 19 has concave portions 19c and 19d located on left and right sides, respectively, of the base 19b. Coils 78 are mounted on the concavities 19c, 19d, with center yokes 80 passing through an interior space of the coils 78. Both ends of the center yokes 80 are attached to respective side portions 82a and 82b of a side yoke 82 so as to be held extending in the direction of movement of the head carriage 18. Further, strip-like magnets 84 are mounted on a lower surface of each of the side portions 82a and 82b of the side yoke 82.

As a result, a top part of the coils 78 of the carriage body 19 is disposed between the center yoke 80 and the magnet 84, with a drive force applied in the A-B direction by an electromagnetic repulsive force generated with respect to the magnetic force of the magnet 84. Accordingly, the coils 78, the center yokes 80, the side yokes 82 and the magnets 84 together form the voice coil motor 64.

Figure 6:
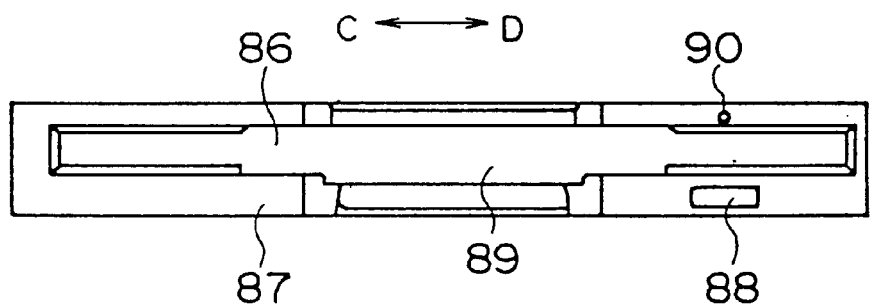
FIG. 6 is a front view of a magnetic disk drive.

FIG. 6 is a front view of the magnetic disk drive of the present embodiment.

As shown in FIG. 6, a front bezel having a disk insertion slot 86 is mounted on a front side edge of the frame 14. Additionally, an eject button 88 is provided on a lower right side of the front bezel 87. The eject button 88 is mounted so as to press an eject switch (not shown in the diagram) mounted inside the front bezel and thereby cause the eject switch to output an eject signal.

Additionally, a flap 89 that blocks the disk insertion slot 86 from the inside is swingingly supported on a rear side of the front bezel 87. Further, a small aperture 90 located above the disk insertion slot 86 is provided in the event that the auto-eject mechanism 24 fails. Inserting a pin into this small aperture 90 from the outside so as to press in direction B a projection 14j provided on the front edge of the slider 14 ejects the disk cartridge.

Figure 7:
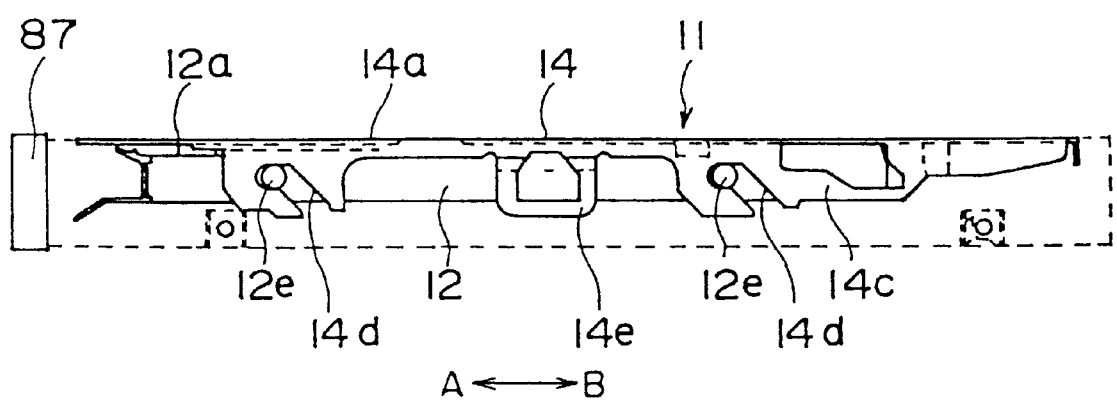
FIG. 7 is a side view of an interaction of a disk holder and a slider in a disk insert/eject state.

FIG. 7 is a side view of an interaction of a disk holder and a slider in a disk insert/eject state.

As shown in FIG. 7, engaging pins 12e of the disk holder 12 engage the slanted grooves 14d on the slider 14, so as the slider 14 slides the engaging pins 12e are driven along the slanted grooves 14d. As a result, when a disk cartridge is loaded and the slider 14 slides in the direction of arrow B from the cartridge load position to arrive at the cartridge insert/eject position, the disk holder 12 ascends to a recording medium unload position.

Additionally, when the eject button 88 is pressed and the slider 14 slides in the direction of arrow A from the cartridge insert/eject position to arrive at the cartridge load position, the disk holder 12 descends to a recording medium load position. Accordingly, the disk holder 12 and slider 14 together form the recording medium transport mechanism.

Figure 8:
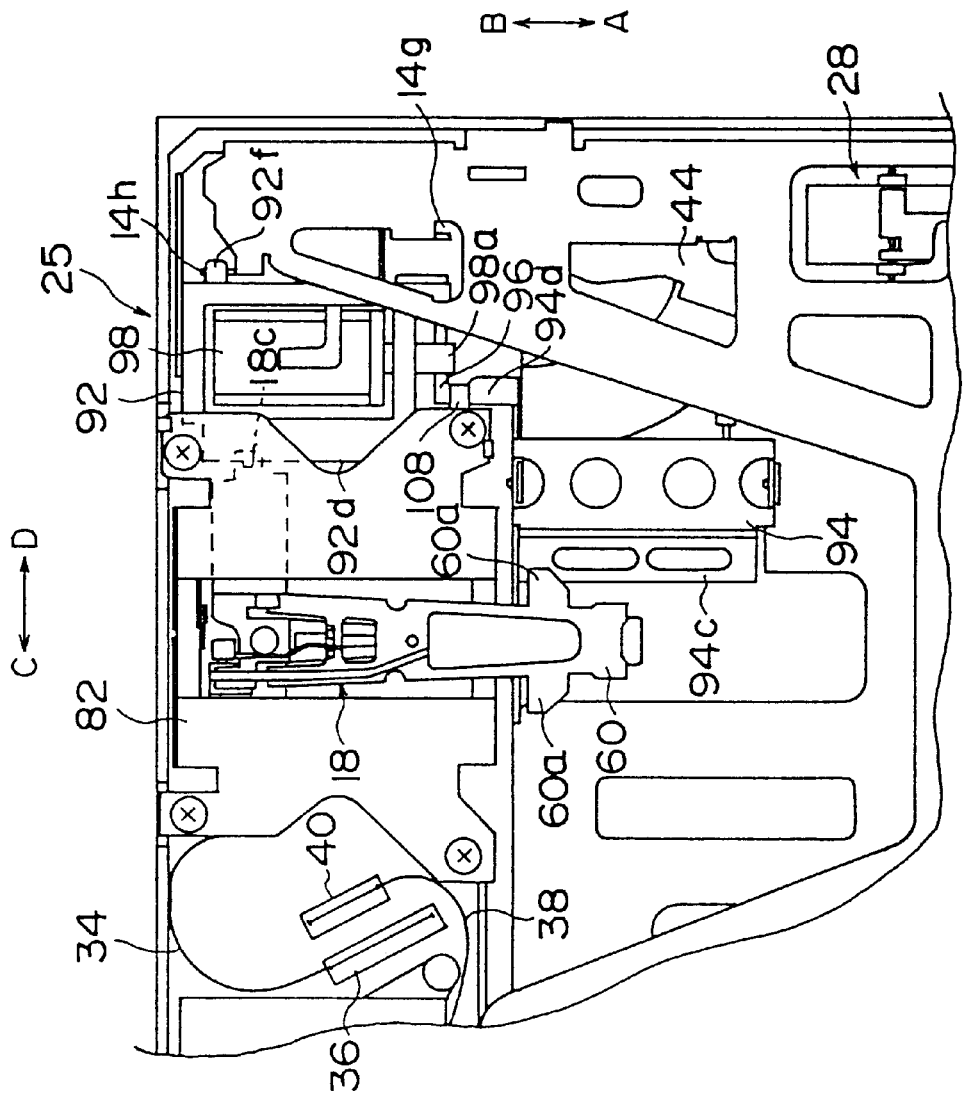
FIG. 8 is an enlarged plan view of the head carriage lock mechanism that comprises the essential portion of the present invention.
Figure 9:
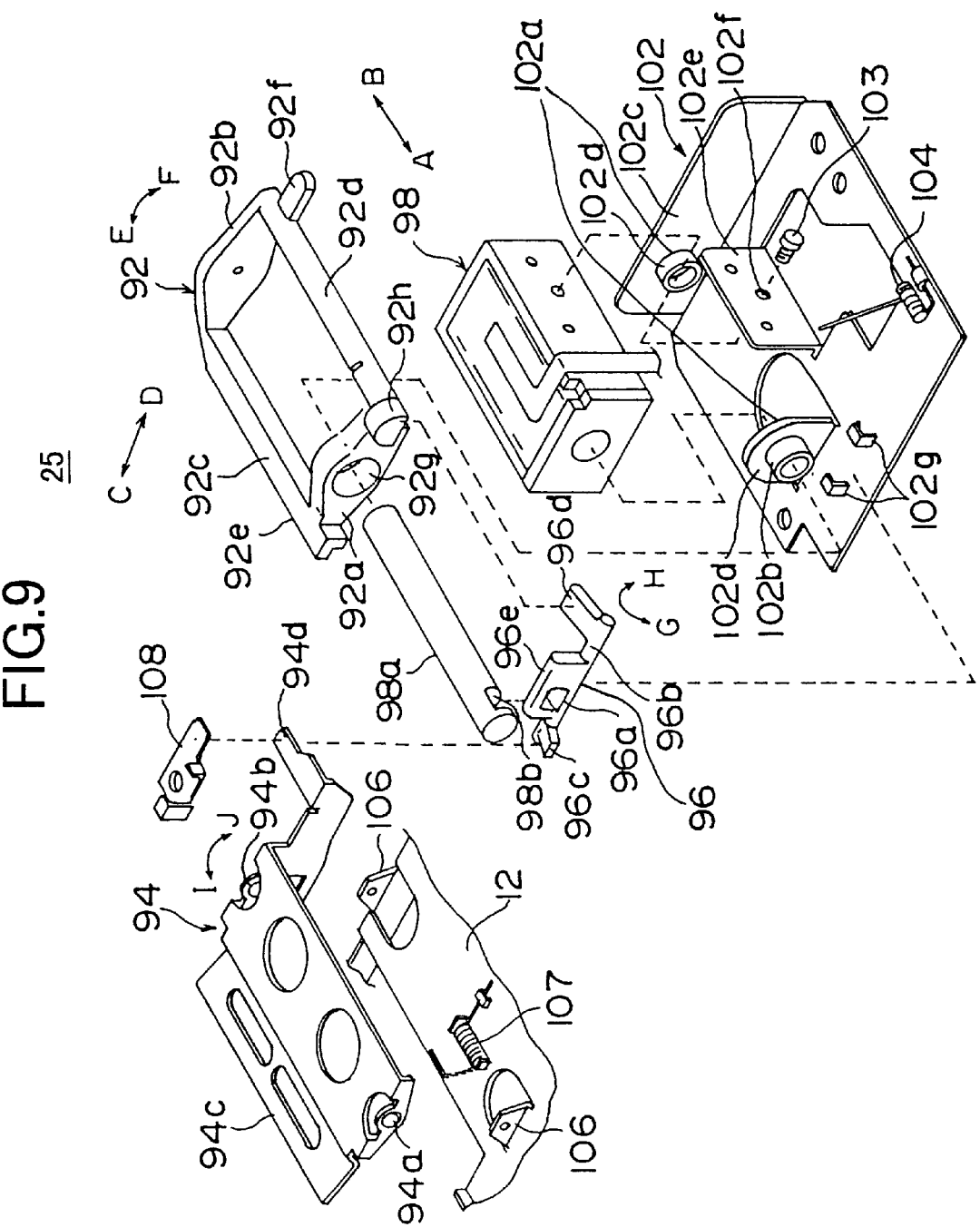
FIG. 9 is an exploded perspective view of the head carriage lock mechanism.

FIG. 8 is an enlarged plan view of the head carriage lock mechanism that comprises the essential portion of the present invention. FIG. 9 is an exploded perspective view of the head carriage lock mechanism As shown in FIGS. 8 and 9, the head carriage lock mechanism 25 essentially comprises the lock member 92, a head arm displacing member or lifter 94, a link member 96 and a solenoid 98. Additionally, the head carriage lock mechanism 25, as will be explained later, locks the head carriage 18 in place so that the head carriage 18 cannot move until a disk cartridge is loaded. The head carriage lock mechanism 25 also moves the head arm 60 to a load position after a predetermined time period has passed after a disk motor has begun to rotate and at the same time unlocks the head carriage 18.

The lock member 92 is formed in the shape of a quadrilateral frame, with a left arm 92c and a right arm 92d disposed so as to extend in an A-B direction between a front panel 92a and a rear panel 92b. The lock member 92 has a rack 92e on the left arm 92c that approaches the head carriage 18 and engages an engaging portion 18c of the head carriage 18. Additionally, the lock member 92 is mounted in such a way that the front panel 92a and the rear panel 92b of the lock member 92 swing or pivot about a central shaft line of the solenoid 98. A contact part 92f that contacts a hold/drive part 14h formed on the right side edge of the slider 14 is formed on the right arm 92d. As a result, the axis of rotation of the lock member is the same as a central shaft 98a of the solenoid 98.

A through-hole 92g through which the central shaft 98a of the solenoid 98 penetrates is formed in the front panel 92a of the lock member 92. A bearing portion 102b of a supporting part 102a of a base 102 is fitted to this throughhole 92g. Additionally, a circular concave part to which is fitted a bearing portion 102d of a supporting part 102c of the base 102, which is hidden from view in FIGS. 8 and 9 and therefore not shown in those diagrams, is provided on the rear panel 92b. Accordingly, lock member 92 is rotatably supported by supporting parts 102a and 102c.

Additionally, the lock member 92 is urged in a clockwise direction, that is, in the direction of arrow F, by a first torsion spring 104 engaged by the base 102 on which the solenoid 98 is mounted. Prior to a disk cartridge being loaded, the lock member 92 is pivoted in the counter-clockwise direction, that is, in the direction of arrow E, by the hold/drive part 14h of the slider 14 lifting the contact part 92f, the rack 92e engages the engaging portion 18c and the head carriage 18 is locked so that the head carriage 18 cannot move.

Then, the slider 14 slides in the direction of arrow A and the hold/drive part 14h of the slider 14 separates from the contact part 92f when a disk cartridge is loaded, so the lock member 92 is pivoted in the clockwise direction, that is, in the direction of arrow F, by the force of the first torsion spring 104. As a result, the rack 92e of the lock member 92 separates from the engaging portion 18c and the head carriage 18 is unlocked. When unlocked, the head carriage 18 is free to move in the A-B direction.

A side surface of the solenoid 98, which is positioned between the supporting parts 102a and 102c of the base 102, is fixedly mounted in place by a screw 103 threaded into a screw hole 102f provided on a side panel 102e of the base 102. Thus the lock member, which as previously mentioned is shaped in the form of a quadrilateral frame, is mounted in such a way as to enclose a periphery of the solenoid 98, making more efficient use of the space inside the disk drive and making it possible to make the disk drive more compact.

Additionally, a pair of supports 102g for supporting the link member 96 are formed on a front of the supporting part 102a of the base 102. The link member 96 has shafts 96a and 96b rotatably supported by the supports 102g. In addition, the link member 96 has at one end a first contact part 96c that contacts the lifter 94, at another end a second contact part 96d that contacts a right side contact part 92h of the lock member 92 and in the middle an engaging part 96e that engages a concavity 98b formed in one end of the shaft 98a of the solenoid 98.

As a result, when the loading of a disk cartridge causes the shaft 98a of the solenoid 98 to be withdrawn by electromagnetic force, the sliding of the shaft 98 in direction B causes the engaging part 96e of the link member 96, which is engaging the shaft 98a, to swing in the direction in which the shaft is sliding, that is, in the direction of arrow H. As a result, the second contact part 96d swings downward and the second contact part 96d no longer presses on the right side contact part 92h of the lock member 92, and thus the lock member 92 is pivoted toward an unlock position, that is, in the direction of arrow F, by the force of the first torsion spring 104.

The lifter 94 is swingingly supported by a pair of supports 106 provided on the cover panel 12a of the disk holder 12, and is urged in the clockwise direction, that is, in the direction of arrow J by the force of a second torsion spring 107 mounted on the cover panel 12a of the disk holder 12.

Additionally, the lifter 94 has shaft holes 94a and 94b that rotatably support a shaft (which cannot be seen in FIG. 9) both ends of which are integrally formed with the supports 106, a contact part 94c that extends in the A-B direction and contacts the projection 60a of the head arm 60, and a drive part 94d that extends rearward from a rear side of the lifter 94.

The drive part 94d is disposed so as to extend to a position opposite and above the first contact part 96c. As a result, when the loading of a disk cartridge causes the shaft 98a of the solenoid 98 to be withdrawn by electromagnetic force, the link member 96 pivots in the direction in which the shaft is sliding, that is, in the direction of arrow H, and the first contact part 96c lifts the drive part 94d of the lifter 94 upward. As a result, the lifter 94 pivots in the counter-clockwise direction, that is, in the direction of arrow I, lowers the head arm 60 and brings the magnetic heads 61, 62 into proximity with the magnetic disk, enabling reading and writing of information to and from the magnetic disk.

Additionally, when the disk cartridge is ejected, the lifter 94 is pivoted by the force of the second torsion spring 107 in the clockwise direction, that is, in the direction of arrow J, the drive part 94d presses the first contact part 96c of the link member 96 downward while rotating the second contact part 96d upward. As a result, the link member 96 lifts the right side contact part 92h of the lock member 92 upward, rotates the lock member 92 in the counter-clockwise direction, that is, in the direction of arrow E, and moves the head carriage 18 to a lock position.

Additionally, a pressing member 108 fixedly mounted on the frame 16 is provided above the drive part 94d of the lifter 94. This pressing member 108 contacts the drive part 94d when the lifter 94 rises when the disk cartridge is ejected.

Then, the lifter 94 is urged by the force of the second torsion spring 107 in a clockwise direction, that is, in the direction of arrow J, or, in other words, in a direction in which the head arm 60 ascends. However, in the event that external shocks or vibrations are transmitted and a force greater than the force of the second torsion spring 107 is transmitted to the head arm 60, there is a possibility that the magnetic heads 61, 62 will collide and be damaged in the process.

As a result, in an eject state the drive part 94d contacts the pressing member 108, so that when the lifter 94 attempts to pivot the swing of the drive part 94d is interrupted by the pressing member 108, the head arm 60 is prevented from descending and a collision of the magnetic heads 61, 62 is prevented.

A description will now be given of the process of mounting the above-described lock member 92 and solenoid 98.

FIGS. 10A, 10B, 10C, 10D, 10E, 10F and 10G are diagrams showing steps in the process of mounting the lock member 92 and the solenoid 98.

Figure 10A:
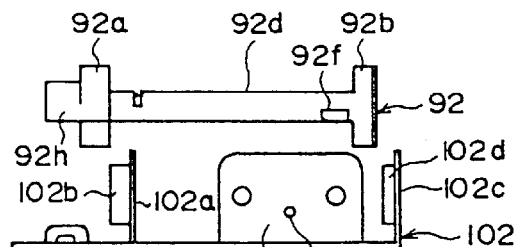
FIGS. 10A, 10B, 10C, 10D, 10E, 10F and 10G are diagrams showing steps in a process of mounting the lock member and the solenoid.

In a step S1 as shown in FIG. 10(A), the lock member 92 is lowered between the supports 102a and 102c of the base 102.

Figure 10B:
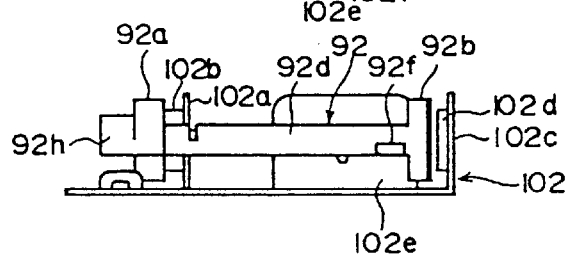

In a step S2 as shown in FIG. 10(B), the center of the front panel 92a of the lock member 92 is disposed opposite the bearing portion 102b of the supporting part 102a of the base 102, and further, the center of the rear panel 92b of the lock member 92 is disposed opposite the bearing portion 102d of the supporting part 102c of the base 102.

Figure 10C:
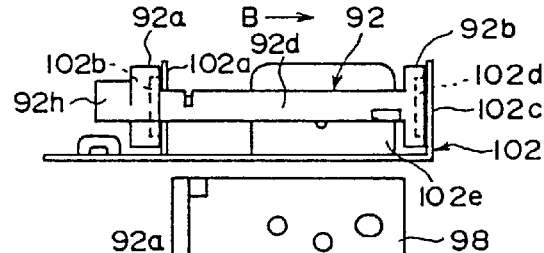

In a step S3 as shown in FIG. 10(C), the lock member is slid in the direction of arrow B, the bearing portion 102b of the supporting part 102a of the base 102 is fitted to the through-hole 92g in the front panel 92a of the lock member 92, and further, the bearing portion 102d of the supporting part 102c of the base 102 is fitted to a concavity not shown in the diagram in the rear panel 92b of the lock member 92. The lock member 92 is now rotatably supported by the supporting parts 102a and 102c of the base 102.

Figure 10D:
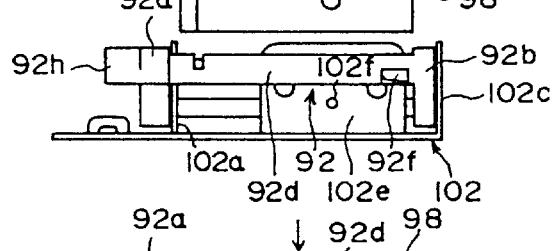

In a step S4 as shown in FIG. 10(D), the solenoid 98 is positioned above the space enclosed by the quadrilateral frame that is the lock member 92.

Figure 10E:
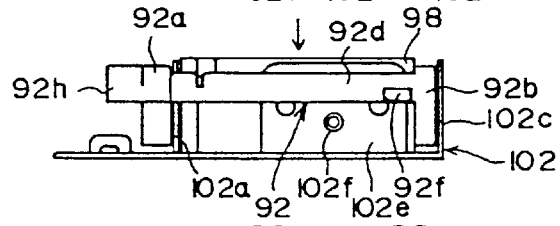

In a step S5 as shown in FIG. 10(E), the solenoid 98 is lowered and rested on the base 102 in such a way as to be contained within the space enclosed by the quadrilateral frame that is the lock member 92.

Figure 10F:
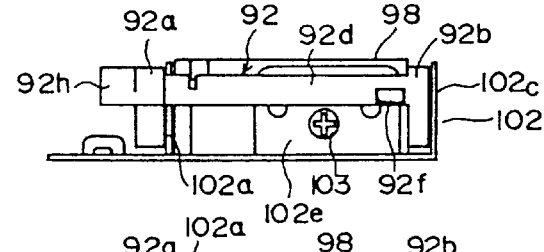

In a step S6 as shown in FIG. 10(F), the screw 103 is threaded into the screw hole 102f provided on the side panel 102e of the base 102 and into a side surface of the solenoid 98, thus fixedly mounting the solenoid 98 on the base 102.

When the solenoid 98 is fixedly mounted on the base 102 as described above, movement in the A-B direction of the lock member 92, which is mounted so as to enclose the solenoid 98, is restricted and the lock member 92 cannot be removed.

Figure 10G:
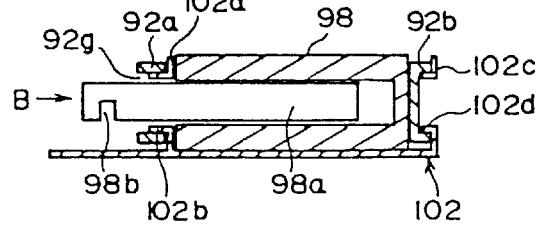

In a step S7 as shown in FIG. 10(G), the shaft 98a of the solenoid 98 is moved in the direction of arrow B from the through-hole 92g in the front panel 92a of the lock member 92 and inserted inside the solenoid 98. The work of installing the lock member 92 and the solenoid 98 is now completed.

By positioning the solenoid 98 inside the space bounded by the lock member 92 as described above the space inside the disk drive can be used more efficiently. At the same time, by fixedly mounting the solenoid 98 the lock member 92 as well can be supported in a rotatable state, simplifying the assembly process.

A description will now be given of the shapes of the rack 92e of the lock member 92 and of the engaging portion 18c of the head carriage 18.

It should be noted that a plurality of teeth are provided on the engaging portion 18c in order to maintain the strength of the engaging portion 18c when the teeth of the rack 92e of the lock member 92 as well as the teeth of the engaging portion 18c of the head carriage 18 are both triangular in shape. However, by making the teeth of the rack 92e and the engaging portion 18c triangular in shape it sometimes happens that, for example, the tips of the teeth of the rack 92e and the engaging portion 18c contact each other. If a plurality of teeth contact each other at the same time, then the pitch tolerance of the rack 92e is such that only the tips of two adjacent teeth are inserted between two adjacent teeth of the rack 92e, with the undesirable result that the head carriage 18 cannot be securely locked.

In order to eliminate the above-describe problem, the teeth of the rack 92e and the teeth of the engaging portion 18c of this embodiment of the present invention are shaped in the form described below.

FIGS. 11A, 11B, 11C and 11D are expanded plan views of an engaging of the rack 92e of the lock member 92 and an engaging portion 18c of the head carriage 18.

Figure 11A:
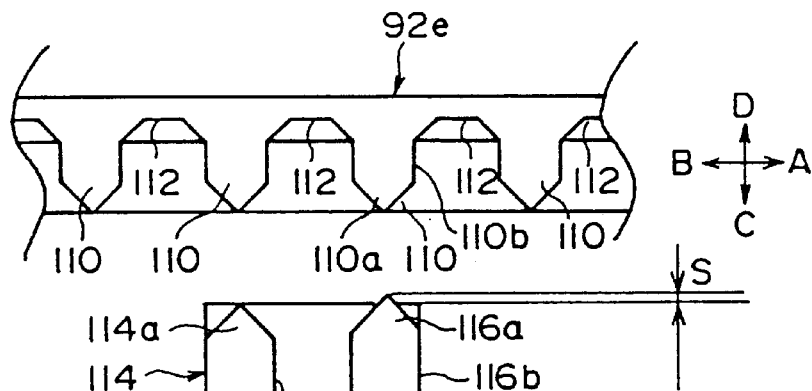
FIGS. 11A, 11B, 11C and 11D are expanded plan views of an engaging of a rack of the lock member and an engaging portion of the head carriage.

As shown in FIG. 11A, when a disk cartridge is loaded the rack 92e of the lock member 92 separates from the engaging portion 18c of the head carriage 18. The tips 110a of the teeth 110 of the rack 92e have a triangular shape, with a supporting portion 110 supporting the tip 110a having straight-line surfaces. Additionally, a trapezoidal concavity 112 is formed between any two adjacent teeth 110 of the rack 92e.

Additionally, in order to maintain the strength of the engaging portion 18c of the head carriage 18, two teeth 114 and 116 are integrally formed from a single piece. The space between two teeth 114 and 116 of the engaging portion 18c is formed so as to have the same pitch as that between the teeth 110 of the rack 92e. Additionally, the two teeth 114 and 116 of the engaging portion 18c have the same shape as that of the teeth 110 of the rack 92e, with tips 114a and 116a having the same triangular shape and supporting portions 110 supporting the tips 110a having straight-line surfaces.

It will be noted that the tip 116a of the tooth 116 on the right side of the engaging portion 18c protrudes beyond the tip 114a of the tooth 114 on the left side of the engaging portion 18c by a distance S.

Figure 11B:
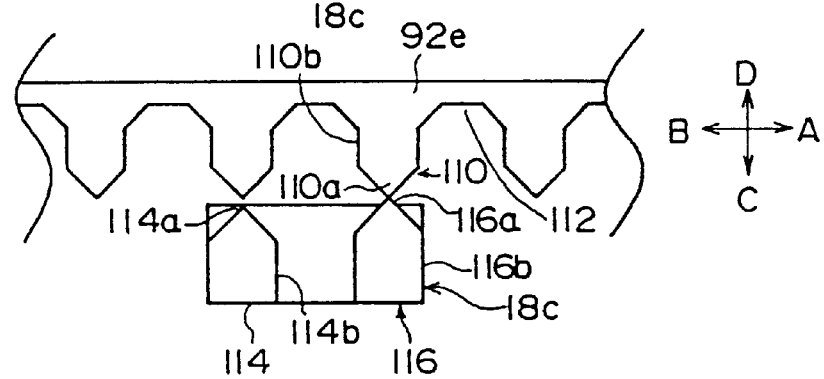

As a result, when the lock member 92 moves in the direction of arrow C as shown in FIG. 11B, the tip 114a of the tooth 114 of the engaging portion 18c is separated from the tip 110a of the tooth 110 of the rack 92e even if the tip 110a of adjacent tooth 110 of the rack 92e hits the tip 116a of the tooth 116 of the engaging portion 18c.

Figure 11C:
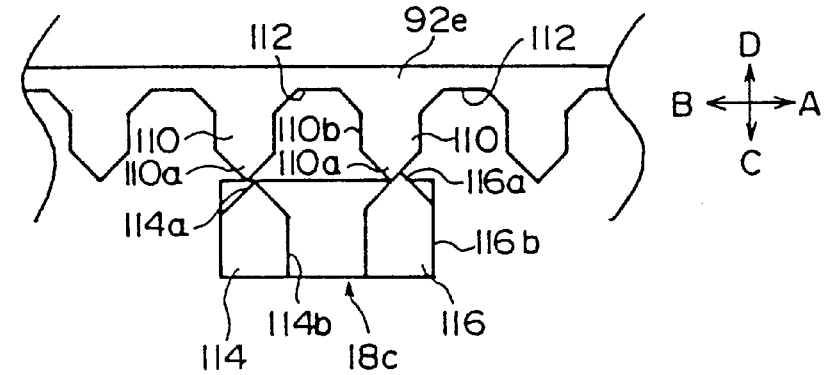

When the lock member 92 moves further in the direction of arrow C as shown in FIG. 11C, the tip 116a of the tooth 116 on the right side of the engaging portion 18c moves laterally, that is, in the direction of arrow A, along the slanted surface of the tip 110a of the tooth 110 of the rack 92e. As a result, the tip 114a of the tooth 114 on the left side is also guided by the tip 116a of the tooth 116 and moves laterally, that is, away from the tip 110a of the tooth 110 of the rack 92e.

Accordingly, the tip 116a of the tooth 116 is engaged first, with the tip 114a of the tooth 114 engaging slightly later. As a result, the respective tips 114a and 116a of the teeth 114 and 116, respectively, can be prevented from engaging the rack 92e at the same time.

Figure 11D:
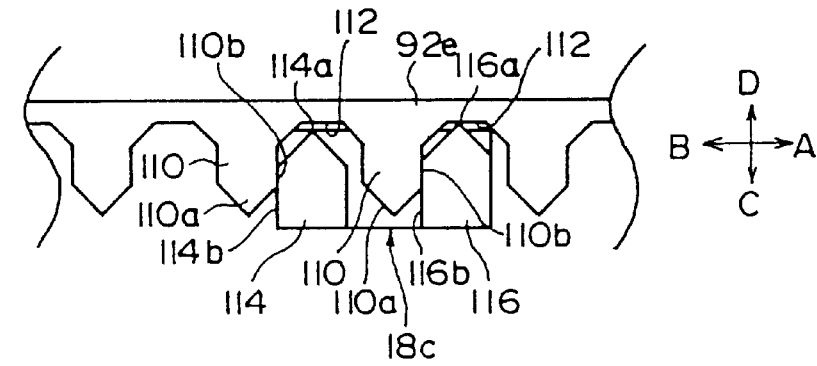

When the rack 92e moves further in the direction of arrow C as shown in FIG. 11D, the teeth 114, 116 of the engaging portion 18c fit inside the trapezoidal concavities 112 between the teeth 110 of the rack 92e. As a result, no state arises in which only the tips of two adjacent teeth of the engaging portion 18c are caught in the space between two adjacent teeth of the rack as is sometimes the case with triangularly shaped teeth formed to the same height, thus making it possible to securely lock the engaging portion 18c of the head carriage 18 with the rack 92e.

Additionally, respective flat supporting portions 100b and 114b, 116b of the teeth 110 and the teeth 114, 116, respectively, contact each other, so the teeth can withstand a large amount of weight and thus maintain the integrity of the lock.

A description will now be given of the operation of loading the disk cartridge together with the operation of the head carriage lock mechanism 25 described above, with reference to FIGS. 12A, 12B and 12C as well as FIGS. 13A, 13B and 13C.

Figure 12A:
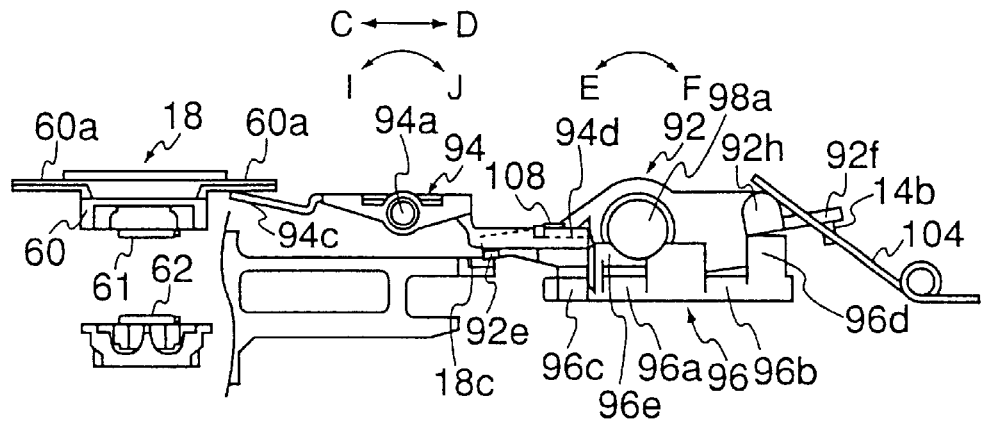
FIGS. 12A, 12B and 12C are front views of successive states of operation of the head carriage lock mechanism.
Figure 12B:
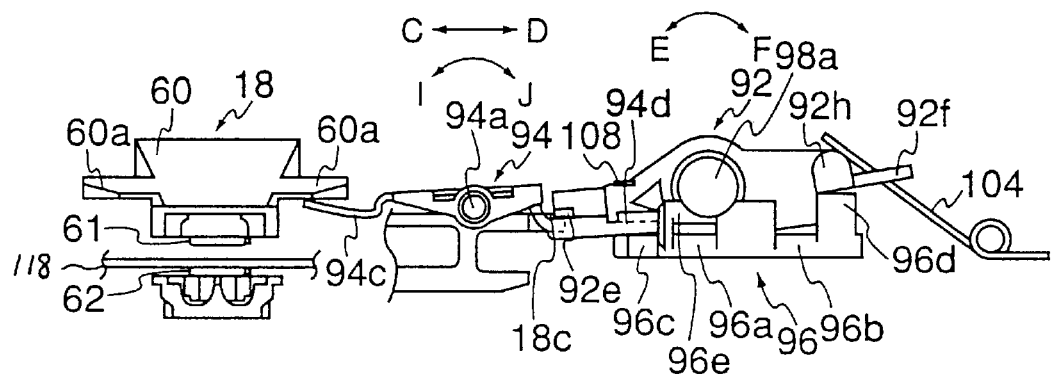
Figure 12C:
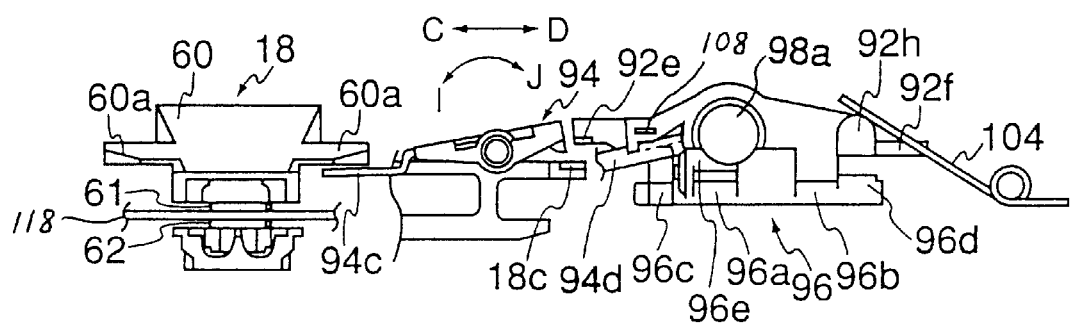

FIG. 12A shows a front view of a state of the head carriage lock mechanism 25 prior to the loading of a disk cartridge as well as during eject. FIG. 12B shows a front view of a state of the head carriage lock mechanism when the disk cartridge is loaded. FIG. 12C shows a front view of a state of the head carriage lock mechanism 25 during recording and reproduction.

Figure 13A:
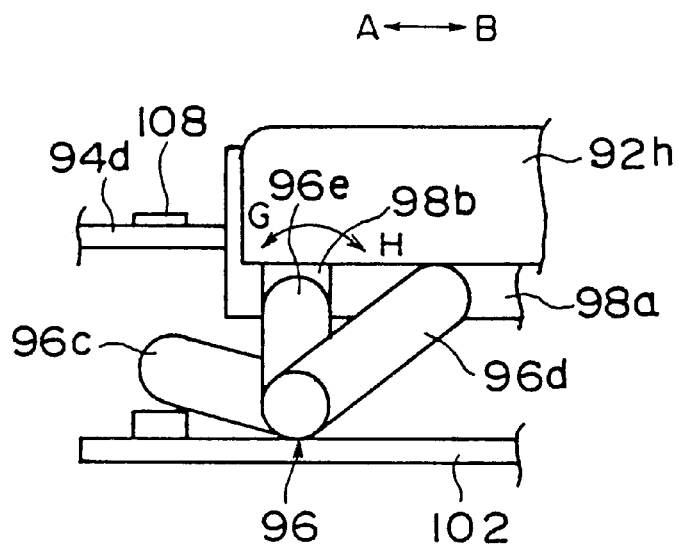
FIGS. 13A, 13B and 13C are side views of successive states of operation of a link member.

Additionally, FIG. 13A shows a front view of a state of the link member 96 prior to the loading of a disk cartridge as well as during eject. FIG. 13B shows a front view of a state of the link member 96 when the disk cartridge is loaded. FIG. 13C shows a front view of a state of the link member 96 during recording and reproduction.

In a state prior to the loading of a disk cartridge as shown in FIG. 12A and FIG. 13A, the disk holder 12 is lifted up and the lifter 94 is pivoted clockwise, that is, in the direction of arrow J, by the force of the torsion spring 107. As a result, the head arm 60 is lifted up to an unload position by the lifter 94 and the magnetic heads 61, 62 are maintained in a state of substantial separation from each other. At this time neither the movement of the shaft 98a of the solenoid 98 nor the movement of the link member 96 is restricted, and these members can thus move freely.

At the same time, the slider is displaced in the direction of arrow B as shown in FIG. 8, so the hold/drive part 14h of the slider 14 is pushing the contact part 92f of the lock member 92 upward. As a result, the lock member 92 pivots in the counter-clockwise direction, that is, in the direction of arrow E, causing the rack 92e to engage the engaging portion 18c of the head carriage 18 and locking the head carriage 18 in place so that the head carriage 18 cannot move. As a result, the head carriage 18 does not move even when external shocks are applied and damage to the head carriage 18 due to such movement can thus be prevented.

Prior to the loading of a disk cartridge, it is not the movement of the shaft 98a of the solenoid 98 in the direction of arrow A but rather the hold/drive part 14h of the slider 14 that swings the lock member 92 in the direction of arrow E via the link member 96. Therefore there is no need to move the shaft 98a of the solenoid 98 in the direction of arrow A when the shaft is released from excitation and thus there is no need for urging means to urge the shaft 98a of the solenoid 98 in the direction of arrow A. Accordingly, the load of the shaft 98a of the solenoid 98 when sliding in direction B is reduced and consequently the drive or excitation current of the solenoid 98 can be made smaller, which helps to reduce power consumption.

Additionally, rotation of the lifter 94 in the direction of arrow I is restricted by the drive part 94d contacting the pressing member 108. As a result, downward movement of the head arm 60 upon application of external shocks is restricted and collision of the magnetic heads 61, 62 can be prevented.

When a disk cartridge is inserted into the disk holder 12 as shown in FIG. 2, the latch lever 44, which is held down by the disk cartridge, rotates in a clockwise direction and releases the slider 14. As a result, the slider 14 slides in the direction of arrow A and lowers the disk holder 12 to the recording medium load position.

Figure 13B:
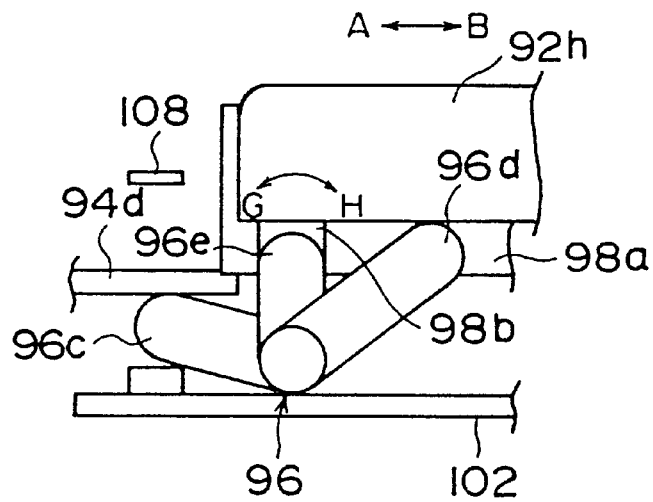

As shown in FIG. 12B and FIG. 13B, when the slider 14 slides in the direction of arrow A, the hold/drive part 14h of the slider 14 separates from the contact part 92f of the lock member 92, releasing the contact part 92f.

Additionally, when the disk holder 12 is lowered to a recording medium load position the lifter 94 mounted on the disk holder 12 also descends, and the head arm 60 is lowered to a position midway between the unload position and the load position. However, the upper magnetic head 62 remains separated from the magnetic disk.

At this time, in the process of descending the drive part 94d of the lifter 94 is driven by the first contact part 96c of the link member 96 and pivots in the direction of arrow I. As a result, the head arm 60 descends further and the distance between the upper magnetic head 62 and the disk 118 decreases to approximately 0.5 mm to 1.5 mm.

By decreasing the distance separating the upper magnetic head 62 and the disk 118 as described above when the disk cartridge is loaded, it is possible to reduce the speed of descent of the during head load to be described later. As a result, the impact on the upper magnetic head 62 and the disk 118 when loading the disk cartridge can be reduced and damage to the disk 118 can be prevented.

Additionally, the drive part 94d of the lifter 94 separates from the pressing member 108 and moves to a position contacting the first contact part 96c of the link member 96. The link member 96 is moved in the direction of arrow G by the drive part 94d of the lifter 94.

At this time, the shaft 98a of the solenoid 98, which has been engaging the link member 96, slides in the direction of arrow A. As a result, the second contact part 96d of the link member 96 rises and pushes the right side contact part 92h of the lock member 92 upward.

As a result, the lock member 92 pivots in the direction of arrow E, causing the rack 92e to engage the engaging portion 18c of the head carriage 18 and locking the head carriage 18.

As a result, even though the magnetic disk inside the disk cartridge is near the lower magnetic head 61, the head carriage 18 is locked by the lock member 92 and so does not move further even when an external shock is applied, thus preventing damage to the magnetic disk.

When a disk cartridge inserted in the disk holder 12 is loaded, the disk motor that drives the turntable 50 is rotatable driven. After the disk has been loaded as shown in FIG. 12C and FIG. 13C, when the rotation of the disk motor achieves a predetermined speed of rotation the solenoid 98 is excited and the shaft 98a is withdrawn in the direction of arrow B. As a result, the link member 96, which engages the shaft 98a, pivots in the clockwise direction, that is, in the direction of arrow H, and the second contact part 96d separates downward from the right side contact part 92h of the lock member 92.

As a result, the lock member 92 is rotated in the clockwise direction, that is, in the direction of arrow F, by the force of the torsion spring 104 and the rack 92e of the lock member 92 separates from the engaging portion 18c of the head carriage 18. As a result, the head carriage 18 is unlocked from the lock member 92 and can move in the direction of the radius of the disk, that is, in the A-B direction.

At the same time, the first contact part 96c of the link member 96 rises and pushes the drive part 94d of the lifter 94 upward, the lifter 94 pivots in the counterclockwise direction, that is, in the direction of arrow I, thus lowering the head arm 60 to the load position. At this time the magnetic heads 61, 62 approach the magnetic disk, which is rotating at high speed, and the reading and writing of information can be performed.

It should be noted that, as described above, the head arm 60 is lowered in stages, the speed with which the upper magnetic head 62 is lowered to the load position is decreased, and moreover the upper magnetic head 62 is displaced to a load position by the force of the air currents generated by the magnetic disk which is rotating at high speed. As a result, the magnetic disk is not damaged by the disk loading operation.

Figure 13C:
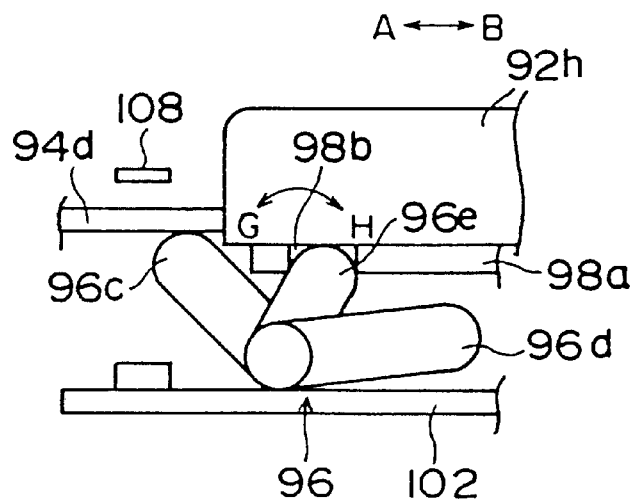

When the eject button 88 is pressed in a state in which the disk is loaded as shown in FIG. 12C and FIG. 13C, the eject switch located on the inside of the front bezel 87 is turned ON and an eject signal is output. After the eject signal has been output the solenoid is released from excitation when the reading or writing of information has been completed. As shown in FIG. 12B and FIG. 13B, the lifter 94 is pivoted in the clockwise direction, that is, in the direction of arrow J, by the force of the torsion spring 107, thus raising the head arm 60 to the unload position.

At the same time, as shown in FIG. 12B and FIG. 13B, the link member 96 that engages the shaft 98a of the solenoid 98 is driven by the drive part 94d of the lifter 94 and rotates in the counter-clockwise direction, that is, in the direction of arrow G, thus returning the shaft 98a in the direction of arrow A. As a result, the second contact part 96d of the link member 96 pivots upward, pushing the right side contact part 92h of the lock member 92 upward.

As a result, the lock member 92 rotates against the force of the torsion spring 104 in the counter-clockwise direction, that is, in the direction of arrow E, and the rack 92e engages the engaging portion 18c of the head carriage 18, locking the head carriage 18 in place. As a result, the head carriage 18 is prevented from moving even with the application of an external shock during an eject operation, thus preventing damage to either the head carriage 18 or the disk.

Additionally, the excitation of the solenoid moves the head arm 60 to the unload position and prevents movement of the head carriage 18, so that damage to either the head carriage 18 or the disk can be more securely prevented in the event of a power failure.

Next, the rotation of the disk motor stops and the rotation of the turntable 50 and the disk stops.

Then, the eject motor 58 of the auto-eject mechanism 24 is rotatably driven and the rotating body 56 having the off-center pin 54 is rotated once in the clockwise direction. As a result, the off-center pin 54 presses the projection 52 of the slider 14 in an eject direction. As a result, the slider 14 slides in the direction of arrow B and at the same time the disk holder 12 is raised to the recording medium unload position as shown in FIG. 7.

At the same time, the hold/drive part 14h provided on the slider 14 contacts the contact part 92f of the lock member 92. As a result, the lock member 92 holds the head carriage 18 in a lock position.

Then, the slider 14 slides in the direction of arrow B and releases the latch lever 44, the latch lever 44 rotates in a counter-clockwise direction and the disk cartridge is ejected in the direction of arrow A.

A description will now be given of the operation of a control circuit 120 of the above-described magnetic disk drive 10.

Figure 14:
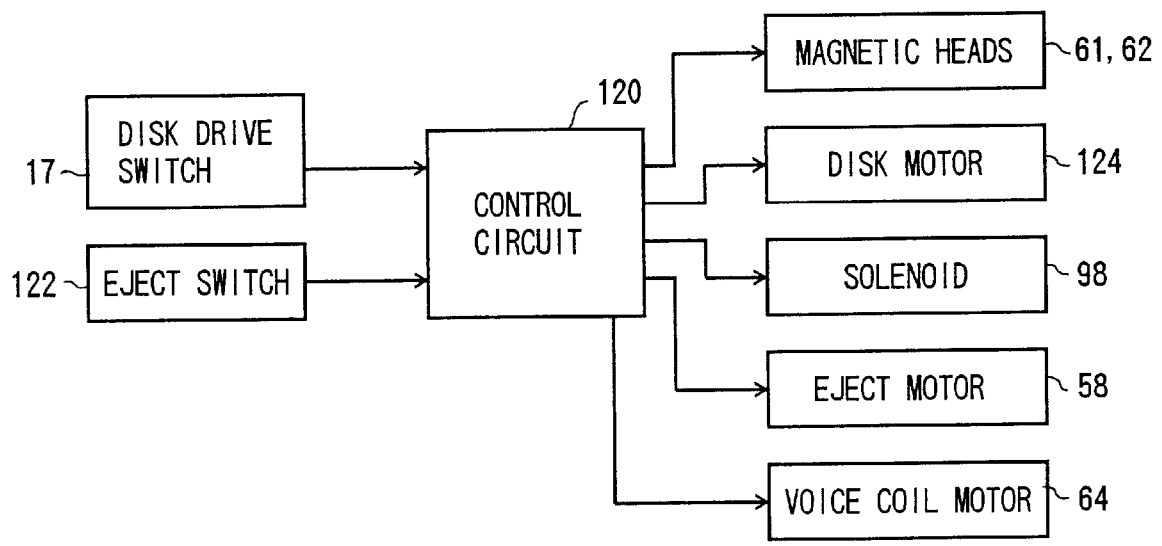
FIG. 14 is a block diagram showing each of the instruments connected to the control circuit.

FIG. 14 is a block diagram showing each of the instruments connected to the control circuit.

As shown in FIG. 14, the disk loading switch 17 described previously, the magnetic heads 61 and 62, the eject motor 58, the voice coil motor 64 and the solenoid 98 are connected to the control circuit 120, that is, the drive control means. Further, an eject switch 122 located on the inside of the front bezel 87 that turns ON when pressed by the eject button 88 and a disk motor 124 that rotatable drives the turntable 50 are also connected to the control circuit 120.

Figure 15:
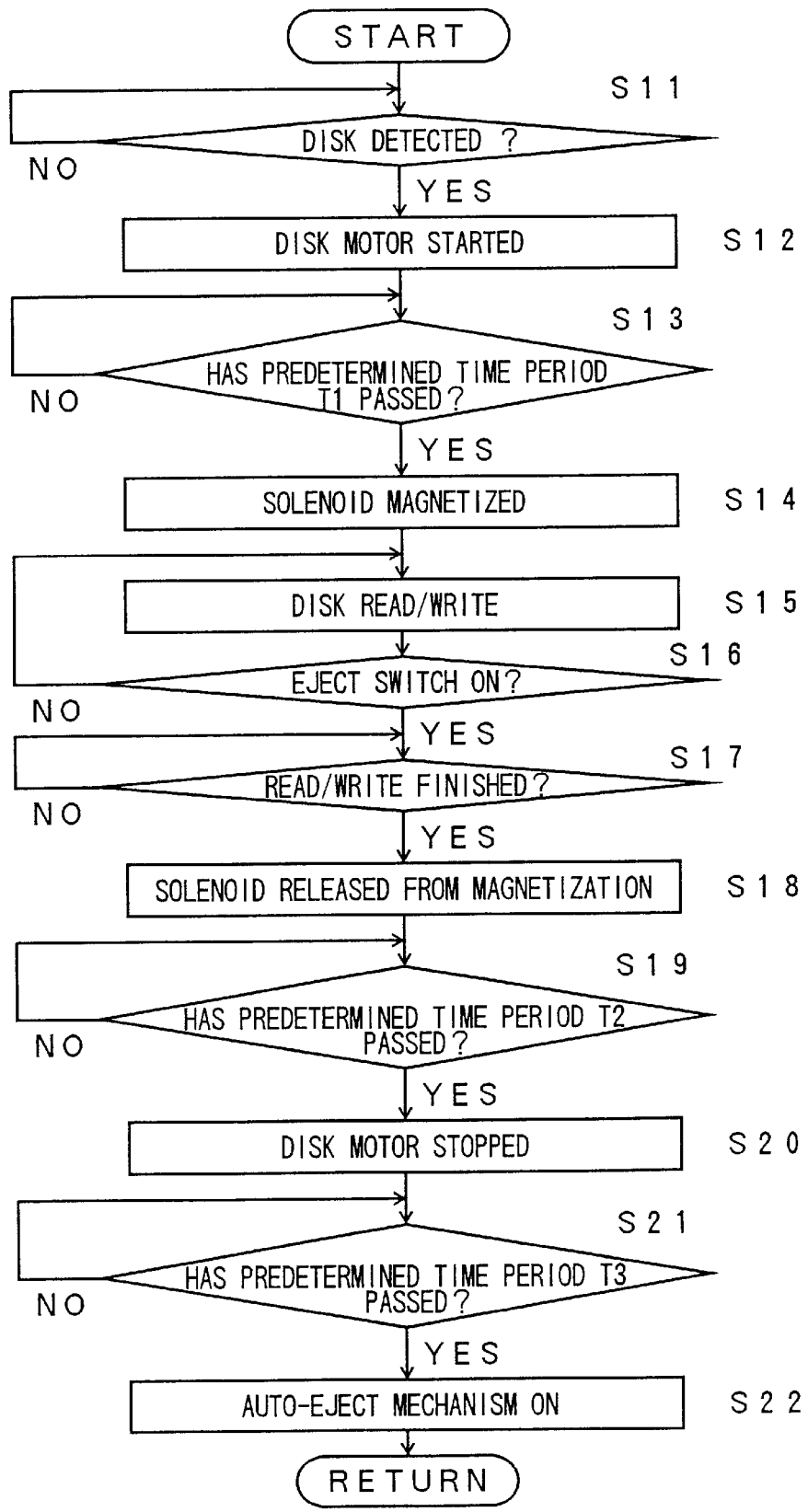
FIG. 15 is a flowchart showing steps in a control process performed by the control circuit.

FIG. 15 is a flowchart showing steps in a control process performed by the control circuit.

As shown in FIG. 15, when the control circuit 120 turns the disk loading switch 17 ON in a step S11, it is determined that a disk cartridge has been loaded, the process proceeds to a step S12 and the disk motor 124 is rotatably driven.

The rotation of the disk motor 124 causes the slider 14 and the disk holder 12 to load and the magnetic disk loaded on the turntable 50 to rotate. In a step S13, it is determined by means of a timer whether or not a predetermined period of time T1 has elapsed. During the elapse of this predetermined time period T1 the rotation of the disk motor 124 increases and the rotation of the disk attains a predetermined rotation speed.

When the predetermined time period T1 has elapsed in a step S13, the process proceeds to a step S14 and the solenoid 98 is excited. As a result, the excitation of the solenoid 98 withdraws the shaft 98a in the direction of arrow B and, as shown in FIG. 12C and FIG. 13C, the link member 96 that engages the shaft 98a rotates in the clockwise direction, that is, in the direction of arrow H, causing the second contact part 96d to separate downward from the right side contact part 92h of the lock member 92.

As a result, the lock member 92 is rotated in the clockwise direction, that is, in the direction of arrow F, by the force of the torsion spring 104, and the rack 92e separates from the engaging portion 18c of the head carriage 18. As a result, the head carriage 18 is unlocked from the lock member 92 and can move in the direction of the radius of the disk, that is, in the A-B direction.

At the same time, the first contact part 96c of the link member 96 rises and pushes the drive part 94d of the lifter 94 upward, so the lifter 94 rotates in the counter-clockwise direction, that is, in the direction of arrow I, lowering the head arm 60 to the load position.

Next, in a step S15, the voice coil motor 64 is driven and the magnetic heads 61 and 62 are moved in the direction of the radius of the disk and reading and writing of information to and from the disk is carried out.

Next, in a step S16 it is determined whether or not the eject switch 122 has been turned ON. If the eject button 88 has been pressed and the eject switch 122 has been turned ON, then the process proceeds to a step S17 in order to confirm that the reading and writing of data to and from the disk has terminated.

Therefore, in step S17 the process awaits the completion of the reading and writing of information to and from the disk by the magnetic heads 61 and 62. Once the reading and writing of information to and from the disk has terminated the process moves to a step S18 and the solenoid 98 is released from excitation.

As described above, and as shown in FIG. 12B and FIG. 13B, the lifter 94 is rotated by the force of the torsion spring 107 in the clockwise direction, that is, in the direction of arrow J, raising the head arm 60 to the unload position.

At the same time, and as shown in FIG. 12B and FIG. 13B, the link member 92 that engages the shaft 98a is rotated in the counter-clockwise direction, that is, in the direction of arrow G, returning the shaft 98a in the direction of arrow A. As a result, the second contact part 96d of the link member 96 is rotated upward, pushing the right side contact part 92h of the lock member 92 upward. Then, the lock member 92 rotates against the force of the torsion spring 104 in the counter-clockwise direction, that is, in the direction of arrow E, and the rack 92e engages the engaging portion 18c of the head carriage 18, locking the head carriage 18 in place.

In a step S19, it is determined whether or not a predetermined period of time T2 has elapsed. During the elapse of this predetermined time period T2 the locking of the head carriage 18 terminates. Once this predetermined time period T2 has elapsed the process proceeds to a step S20 and the rotation of the disk motor 124 is terminated.

Next, in a step S21, it is determined whether or not a predetermined period of time T3 has elapsed. During the elapse of this predetermined time period T3 the inertial rotation of the disk motor 124 terminates. Once this predetermined time period T2 has elapsed the process proceeds to a step S22, the eject motor 58 is driven and the rotating body 56 having the off-center pin 54 of the automobile-eject mechanism 24 is rotated in the clockwise direction. As a result, the off-center pin 54 presses the projection 52 of the slider 14 in the eject direction and slides the slider 14 in the direction of arrow B.

As a result, the disk holder 12 rises to the recording medium unload position as shown in FIG. 7. Then, when the slider 14 slides in the direction of arrow B and unlocks the latch lever 44, the latch lever 44 rotates in the counter-clockwise direction and ejects the disk cartridge in the direction of arrow A.

It will be noted that a magnetic disk drive is used in the description of the embodiment of the present invention. However, the present invention is not limited to a magnetic disk drive but can of course be adapted for use with an optical disk drive or a magneto-optic disk drive, or with a recording/reproducing device loading a card-like recording medium such as a memory card and the like.

Additionally, in the above-described embodiment the slider slides the disk holder upward. However, the present invention is not limited to such an embodiment but can be adapted for use with a configuration in which, for example, the slider slides the disk holder downward.

Additionally, the above-described embodiment is configured so that the axis of rotation of the lock member 92 is coaxial with the shaft 98a of the solenoid 98. However, the present invention is not limited to such an embodiment and the axis of rotation of the lock member 92 may instead be positioned so as to be offset from yet parallel to the longitudinal axis of the shaft 98a of the solenoid 98.

Additionally, in the above-described embodiment the slider 14 slides over the top of the disk holder 12. However, the present invention is not limited to such an embodiment and the slider 14 may, for example, be made to slide under the bottom of the disk holder 12.

Additionally, in the above-described embodiment the hold/drive part 14h that holds the lock member 92 in a lock position is provided on the slider 14. However, the present invention is not limited to this embodiment but the hold/drive part 14h may instead be provided on the disk holder 12.

Additionally, the hold/drive part 14h of the slider 14 may instead be configured so that the hold/drive part 14h does not directly hold the lock member 92 in a lock position but may instead hold the lock member 92 in a lock position indirectly via some other member.

The above description is provided in order to enable any person skilled in the art to make and use the invention and sets forth the best mode contemplated by the inventor of carrying out the invention.

The present invention is not limited to the specifically disclosed embodiment, and variations and modifications may be made without departing from the scope of the present invention.

The present application is based on Japanese Priority Application Nos. 10-309101 and 10-309102 filed on Oct. 29, 1998, the entire contents of which are hereby incorporated by reference.

What is claimed is:

1. A disk drive comprising:
   a head reading information from and writing information to a disk-like recording medium;
   a head carriage supporting the head and moving in a radial direction of the disk-like recording medium;
   a lock member locking a position of the head carriage; and
   a solenoid driving the lock member,
   said lock member comprising:
   an arm part disposed so as to be aligned in a direction of movement of the head carriage, and having first and second ends and an engaging part that engages and locks the head carriage; and
   first and second supporting parts respectively extending from near the first and second ends of the arm part and supporting the engaging part,
   said solenoid being contained within a space defined by the arm part and the first and second supporting parts.

2. The disk drive as claimed in claim 1, wherein a rotational center of the lock member and a shaft driven by the solenoid are coaxially disposed.

3. The disk drive as claimed in claim 1, wherein the lock member comprises a quadrilaterial frame formed by a pair of arm parts and the first and second supporting parts disposed at right angles to and connected with both ends of the pair of arm parts.

4. The disk drive as claimed in claim 1, wherein the solenoid drives a lifter that contacts a head arm of the head carriage so as to bring the head close to the disk-like recording medium at the same time as the solenoid unlocks the locking of the head carriage by the lock member.

5. A disk drive comprising:

a recording medium transport mechanism transporting a disk-like recording medium to a predetermined load position;

a head reading information from and writing information to a disk-like recording medium;

a head carriage supporting the head and moving in a radial direction of the disk-like recording medium; and a lock member having a lock position for locking a position of the head carriage, said recording medium transport mechanism having a holding part which holds the lock member in the lock position.

6. The disk drive as claimed in claim 5, wherein the holding part is provided on a slider that slides in response to an insertion of a disk-like recording medium.

7. The disk drive as claimed in claim 6, wherein the lock member is disposed between the holding part formed on the slider and the head carriage.

\* \* \* \* \*